(12) United States Patent
Gross

(10) Patent No.: US 11,273,996 B2
(45) Date of Patent: Mar. 15, 2022

(54) SUCTION GRIPPER FOR HANDLING SMALL PIECE GOODS

(71) Applicant: Becton Dickinson Rowa Germany GmbH, Kelberg (DE)

(72) Inventor: Dietmar Gross, Kelberg (DE)

(73) Assignee: CAREFUSION GERMANY 326 GMBH, Kelberg (DE)

(*) Notice: Subject to any disclaimer, the term of this patent is extended or adjusted under 35 U.S.C. 154(b) by 140 days.

(21) Appl. No.: 16/751,605

(22) Filed: Jan. 24, 2020

(65) Prior Publication Data
US 2021/0229936 A1    Jul. 29, 2021

(51) Int. Cl.
*B65G 47/91* (2006.01)
*B25J 15/06* (2006.01)
(Continued)

(52) U.S. Cl.
CPC .......... *B65G 47/915* (2013.01); *B25J 13/086* (2013.01); *B25J 13/088* (2013.01);
(Continued)

(58) Field of Classification Search
CPC .. B65G 47/914; B65G 47/915; B65G 47/918; B25J 15/0057; B25J 15/0616; B25J 13/086; B25J 13/088; B25J 18/02
See application file for complete search history.

(56) References Cited

U.S. PATENT DOCUMENTS

| 4,516,765 A | * | 5/1985 | Stocco | B65G 47/915 |
| | | | | 271/107 |
| 4,645,063 A | * | 2/1987 | Seragnoli | A24C 5/326 |
| | | | | 198/450 |

(Continued)

FOREIGN PATENT DOCUMENTS

| EP | 3730257 A1 * 10/2020 | ......... B25J 15/0057 |
| JP | S62176783 A   8/1987 | |

(Continued)

OTHER PUBLICATIONS

Extended European Search Report for Application No. 20153600.0, dated Jul. 27, 2020, 14 pages.

*Primary Examiner* — Dean J Kramer
(74) *Attorney, Agent, or Firm* — Morgan, Lewis & Bockius LLP

(57) ABSTRACT

A suction gripper for handling small piece goods, particularly pharmaceutical packages, is provided. The suction gripper is suitable for handling different small piece goods. The suction gripper includes a main element, a rotary drive arranged on the main element with an axis of rotation which is vertical in the starting position, an end-effector unit coupled to the axis of rotation, wherein the end-effector unit has a holding element, to which a suction arm holder is fastened, wherein the suction arm holder has at least two elongated suction arms which each have a suction head with a suction surface at their distal end, wherein the suction arms are designed such that a negative pressure can be applied to them. The suction arm holder is rotatably mounted on the holding element, and the suction surfaces of the suction heads are dimensioned differently for handling different types of small piece goods.

17 Claims, 5 Drawing Sheets

(51) Int. Cl.
  *B25J 13/08* (2006.01)
  *B25J 15/00* (2006.01)
(52) U.S. Cl.
  CPC ....... *B25J 15/0057* (2013.01); *B25J 15/0616* (2013.01); *B65G 47/918* (2013.01)

(56) References Cited

U.S. PATENT DOCUMENTS

| | | | |
|---|---|---|---|
| 4,860,438 A * | 8/1989 | Chen | H05K 13/0413 29/740 |
| 6,088,911 A | 7/2000 | Isogai et al. | |
| 6,311,824 B1 * | 11/2001 | Van Pul | B65G 47/848 198/370.12 |
| 8,414,247 B2 * | 4/2013 | Yeh | B25J 15/0052 414/800 |
| 2014/0197652 A1 * | 7/2014 | Wang | B25J 15/0616 294/185 |
| 2019/0300221 A1 | 10/2019 | Motowaki | |

FOREIGN PATENT DOCUMENTS

| | | |
|---|---|---|
| JP | 2001210997 | 4/1999 |
| JP | H11103198 | 4/1999 |
| KR | 20090097391 A | 9/2009 |

* cited by examiner

SUCTION GRIPPER FOR HANDLING SMALL PIECE GOODS

BACKGROUND

The present disclosure relates to a suction gripper for handling small piece goods, wherein said small piece goods are particularly pharmaceutical packages.

SUMMARY

One or more embodiments provide a suction gripper. The suction gripper includes a main element and a rotary drive arranged on the main element with an axis of rotation that is vertical in a starting position. The suction gripper also includes an end-effector unit coupled to the axis of rotation, wherein the end-effector unit has a holding element, to which a suction arm holder is fastened, wherein the suction arm holder has at least two elongated suction arms which each have a suction head with a suction surface at their distal end, wherein the suction arms are designed such that a negative pressure can be applied to them. The suction arm holder is rotatably mounted on the holding element, and the suction surfaces of the suction heads are dimensioned differently for handling different types of small piece goods.

One or more embodiments provide a suction gripper for handling small piece goods. The suction gripper includes a base and a rotary drive arranged on the base, the rotary drive comprising an axis of rotation, wherein the axis of rotation is vertical in a starting position. The suction gripper also includes an end-effector unit coupled to the axis of rotation, the end-effector unit comprising a holding assembly. The suction gripper further includes suction arm holder rotatably mounted on the holding assembly, the suction arm holder comprising at least two elongated suction arms, each elongated suction arm having a suction head with a suction surface at a distal end.

The foregoing and other features, aspects and advantages of the disclosed embodiments will become more apparent from the following detailed description and accompanying drawings.

BRIEF DESCRIPTION OF THE DRAWINGS

In the following, one or more embodiments of the suction gripper according to the disclosure shall be described with reference to the drawings.

DETAILED DESCRIPTION

Figure 1C:
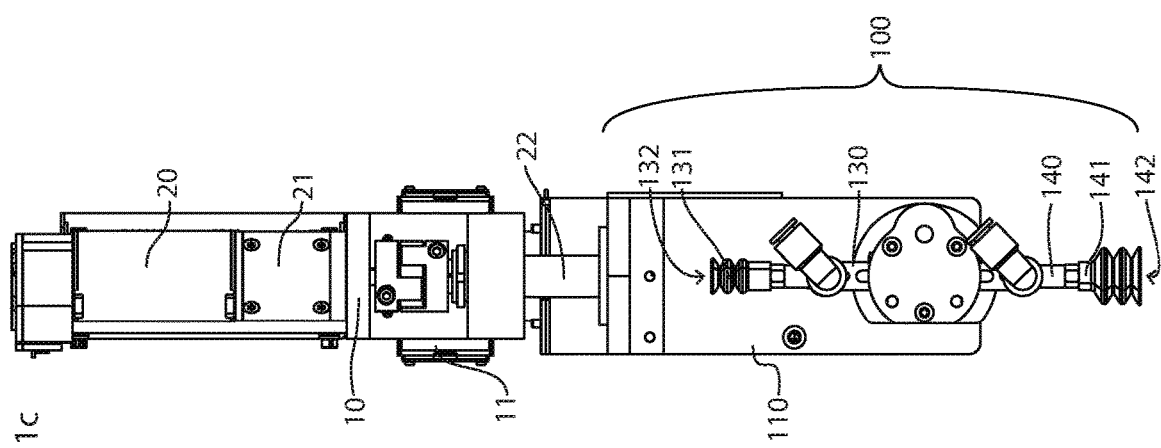
FIG. 1c is a side view of the suction gripper of FIG. 1.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Typical suction grippers are known, wherein they are used particularly for handling paper products. Due to the fact that these paper products always have large surfaces and are relatively light, the suction grippers used for handling paper goods are not suitable for handling piece goods of different sizes and/or different weights.

The present disclosure addresses the problem of providing a suction gripper, with which small piece goods of different size and/or different weight can be handled safely.

In one or more embodiments, a suction gripper according to the disclosure for handling small piece goods, particularly pharmaceutical packages, includes a main element, via which the suction gripper can be fastened to a manipulator. With said manipulator, the suction gripper is regularly movable freely in space in three dimensions. A rotary drive with an axis of rotation which is vertical in the starting position of the suction gripper is arranged on the main element of the suction gripper. Whenever reference is made to the alignment of axes in the course of this patent application, said alignment refers to the vertical axis of rotation of the rotary drive arranged on the main element. The starting position of the suction gripper refers to the axis of rotation extending in the vertical Z-direction.

An end-effector unit is coupled to the afore-mentioned axis of rotation, wherein said end-effector unit has a holding element, to which a suction arm holder is fastened, wherein the suction arm holder has at least two elongated suction arms which each have a suction head with a suction surface at their distal end. The suction arms are designed such that a negative pressure can be applied to them. For the disclosure as such, it is not essential how said negative pressure is applied in detail. For example, negative pressure can be specifically applied to a suction arm via a central feed via a valve arranged in the suction arm holder. As another example, it is conceivable that the air flow rate of the suction heads is kept so low that a central application of negative pressure is sufficient. According to another example, negative pressure can be applied separately to each suction arm.

According to the disclosure, it is provided that the suction arm holder is rotatably mounted on the holding element, and the suction surfaces of the suction heads are dimensioned differently for handling different types of small piece goods. The design of the suction arm holder and the suction heads according to the disclosure makes it possible by a simple rotation of the suction arm holder to bring into position the suction head which is best suited for handling the next small piece good to be picked up. In order to ensure that the suction gripper is even capable of picking up a small piece good from an unsorted heap of small piece goods, a detection of this collection of small piece goods is required, and in addition, it must be determined, which surface of which small piece good must be approached next for the handling of a small piece good. For the detection, for example, an image recognition and, additionally or alternatively, a height measurement by laser can be performed. However, the devices and methods necessary thereto are not part of the present patent application, but merely provide information on how to control the suction gripper according to the disclosure.

On the basis of the surface to be handled next, a suction head most suitable for this purpose can, according to the disclosure, be selected quickly. If, for example, the surface of the small piece good to be handled is relatively large, it is sensible to bring into position a suction head with a large suction surface by a corresponding rotation of the suction arm holder. However, if the surface is relatively small, for example, the side surface of a pharmaceutical package, it is sensible to use a suction head with a small suction surface. If small piece goods are supposed to be removed with the suction gripper particularly from a randomly assembled heap, the suction gripper according to the disclosure is particularly advantageous because the surfaces easiest to handle can differ greatly. For example, it is conceivable that, if a suction gripper with only one suction head with a large suction surface is used, surfaces with widths smaller than the diameter of the suction head cannot be handled. With the suction gripper according to the disclosure, small piece goods of different sizes can thus be processed quickly in that the suction head is adapted to the conditions of the small piece good to be handled, or more precisely, is adapted to the contact surface of the small piece good to be handled.

The suction gripper according to the disclosure must be coupled with a manipulator which moves the suction gripper in space, i.e., guides the suction head toward the surface to be handled of the small piece good to be picked up. In order to simplify the placement of a suction head on a surface, it is provided in one or more embodiments of the suction gripper according to the disclosure that the suction arms are designed to be radially movable. In one or more embodiments, it is thus possible to bridge, for example, the last millimeters before contact between the suction head and the contact surface to be handled by moving only the suction arm in a radial manner. This prevents that the entire suction gripper must be moved for the last few millimeters, which is more difficult due to the need for spatial movement than a mere radial movement of a suction arm.

In order to ensure a radial movability of the suction arms, it is conceivable that each suction arm is coupled with its own drive which effects the radial movement of the suction arm. In order to ensure the radial movability of the suction arms, but to also minimize the structural complexity, it is provided in one or more embodiments that two opposite suction arms are designed as a one-piece suction element with two opposite suction heads, wherein the suction element is radially movable. In such case, the one-piece design of the suction element requires that, if, for example, a suction arm section of the suction element is moved to a small piece good, i.e., said suction arm portion is extended, the other suction arm portion of the suction element is "retracted," which does not impede the functionality of the suction gripper because only one suction arm at a time is used to handle a small piece good.

The rotatability of the suction arm holder and the radial movability of the suction arms require that, in the event that both movements are supposed to be performed separately, the suction gripper has at least two drives, one for the rotational movement of the suction arm holder and one for the radial movement, for example, of the suction arm element. However, in order to keep the suction gripper structurally simple, it is provided in one or more embodiments that the suction gripper comprises a gear unit which is fastened to the holding element opposite the suction arm holder, wherein the gear unit comprises two coaxial axes, wherein the first axis interacts with and effects a rotation of the suction arm holder, and the second axis interacts with and effects a radial movement of the suction element or a suction arm.

According to the disclosure, the suction arm holder of the suction gripper is rotatably mounted on the holding element. In one or more embodiments, the suction arms or the suction element are furthermore radially movable. In order to ensure that, after an unscheduled interruption of the operation or after a new installation, the suction gripper does not have to be moved manually to a predetermined reference position, but a defined alignment of the suction arm holder and the suction arms can be achieved automatically instead, it is provided in one or more embodiments that the suction gripper has a rotation scanner and the suction arm holder has a plurality of rotation position sensors, wherein the rotation scanner and the rotation position sensors can interact with one another. In order to know the angle, at which the suction arm holder stands, it is moved until an interaction between the rotation scanner and a rotation position sensor can be detected. Depending on which position sensor is detected, the angle position of the suction arm holder can be deduced. Alternatively or additionally, the suction gripper comprises at least one radial scanner and each suction arm comprises a radial position sensor, wherein the radial scanner and the radial position sensor can interact with one another. If the positioning of a suction arm is unknown, it is moved radially until there is an interaction between the scanner and the position sensor, wherein this interaction defines a specific predetermined position of the suction arm.

According to the disclosure, it is provided that negative pressure can be applied separately to each suction arm. As already stated above, it is not essential for the disclosure as to how this is solved purely structurally. In one or more embodiments, it is provided that each suction arm has a suction nozzle which can be coupled to a suction line, wherein a negative pressure can be applied separately to each suction line. The negative pressure is thus not applied by the inner components of the suction gripper, but from the outside, so that the design of the suction gripper can be kept fairly simple. When using the suction nozzle/suction line combination, it is also easy to eliminate any occurring leaks.

Figure 1B:
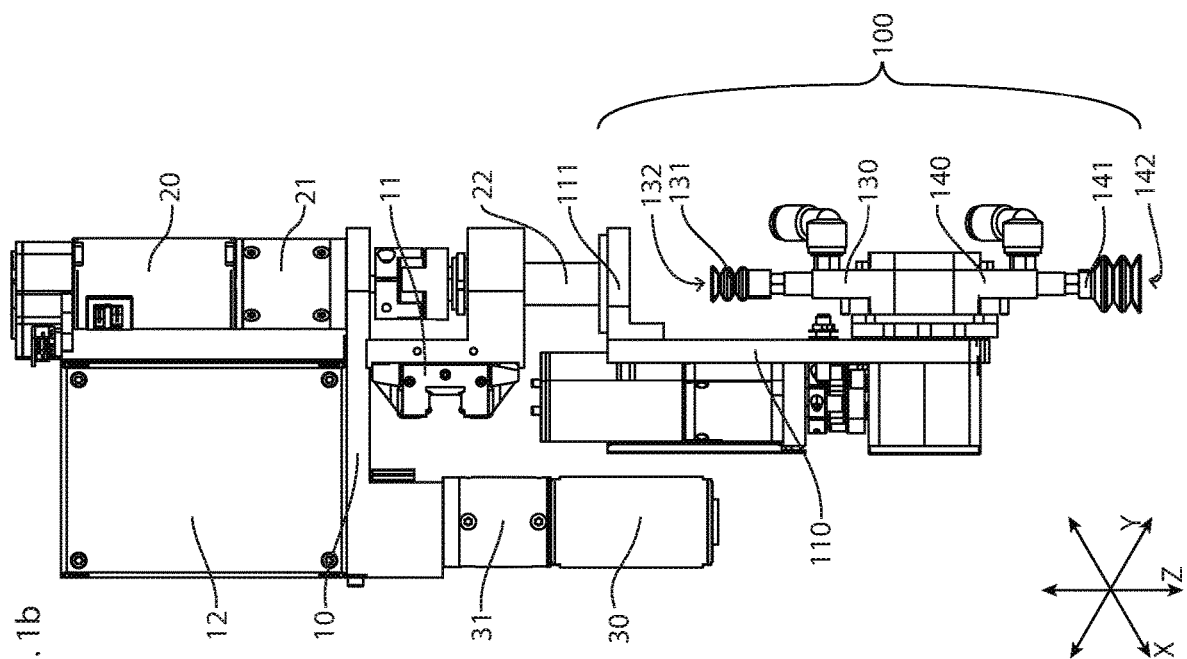
FIG. 1b is a rear view of the suction gripper of FIG. 1.
Figure 1A:
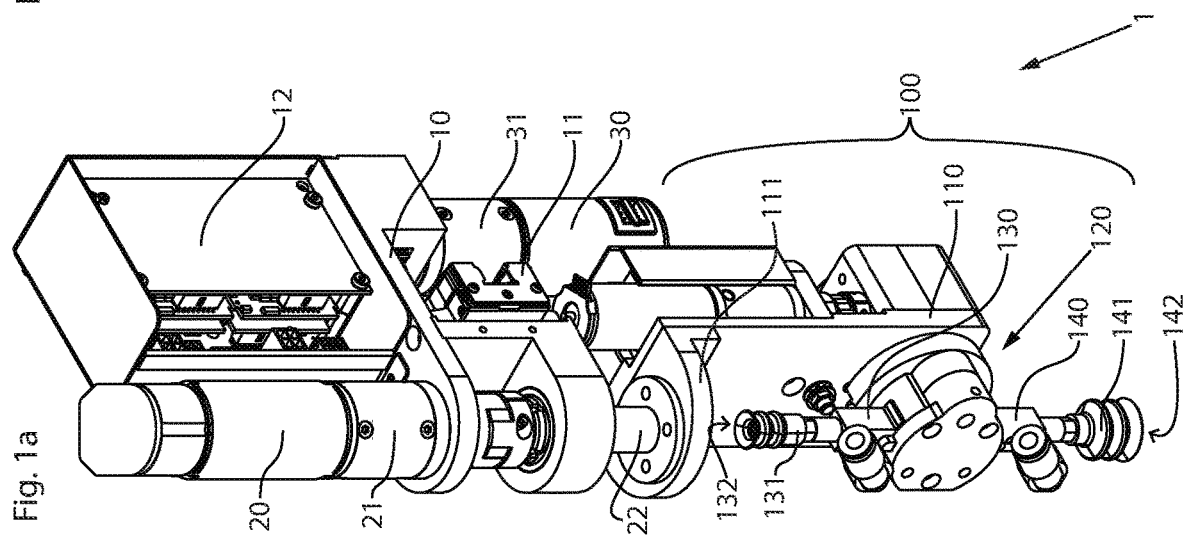
FIG. 1a is a perspective view of a suction gripper.

FIGS. 1a-1c show various views of a suction gripper 1 according to the disclosure. The suction gripper 1 includes a horizontally aligned main element 10 (e.g., base), on which a control device 12 is arranged, which converts received signals into control signals for the suction gripper. The main element is designed plate-like and has a projection. In one or more embodiments, the main element can also be designed differently. A drive 30 with a corresponding gear 31 is fastened below the control device 12. The gear is coupled to a toothed wheel (not shown) which is accommodated in the main element and which moves the suction gripper along a guide (not shown) in the Y-direction. The suction gripper is fastened with a carriage 11 to said guide, said carriage 11 being fastened below the main element via a projection. The guide (not shown) for the carriage 11 is part of a manipulator, by which the guide can be moved along the Z- and the X-axis.

Furthermore, a rotary drive 20 with an associated gear 21 is arranged on the main element 10. An axis of rotation 22, aligned in the Z-direction, extends through an opening (not depicted) in the main element, wherein, at the lower end of said axis of rotation 22, an end-effector unit 100 is arranged which is rotatable via the rotary drive 20. In the depicted starting position, the axis of rotation corresponds to a vertical or Z-axis of the suction gripper.

The end-effector unit 100 comprises a vertically aligned holding element 110 which is coupled via a projection 111 to the axis of rotation 22 and in the depicted embodiment is designed to be plate-like. In the lower section of the holding element 110 (e.g., holding assembly), a suction arm holder 120 is rotatably arranged. The suction arm holder comprises two suction arms 130, 140, each having a suction head 131, 141 at their distal ends. According to the disclosure, the two suction heads 131, 141 have differently dimensioned suction surfaces 132, 142. The suction surfaces themselves are designed to be circular which, however, is not essential for the disclosure itself. Instead, it is essential that the suction arm holder is rotatable, and so, depending on the surface to be suctioned, the suction head with the matching suction surface can be brought into position by rotating the suction arm holder.

Figure 2:
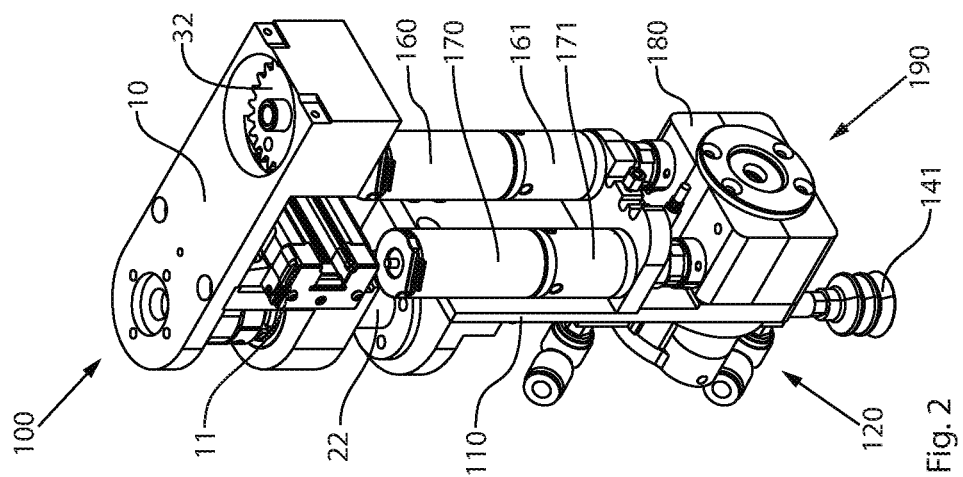
FIG. 2 is a perspective view of an end-effector unit.

FIG. 2 shows an oblique view of the end-effector unit 100. Opposite the suction arm holder 120, FIG. 2 shows a gear unit 190 with a cover 180. Above the gear unit 190, two drives 160, 170 with associated gears 161, 171 can be seen. The two drives 160, 170 are provided on the one hand for rotating the suction arm holder 120 and on the other hand for radially moving the suction arms, as shall be described in detail with reference to the following drawings. In an opening of the main element 10, FIG. 2 shows a toothed wheel 32 which interacts with the drive unit 30 shown in FIGS. 1a-1c, and via which the suction gripper itself can be moved on the guide (not shown).

Figure 3B:
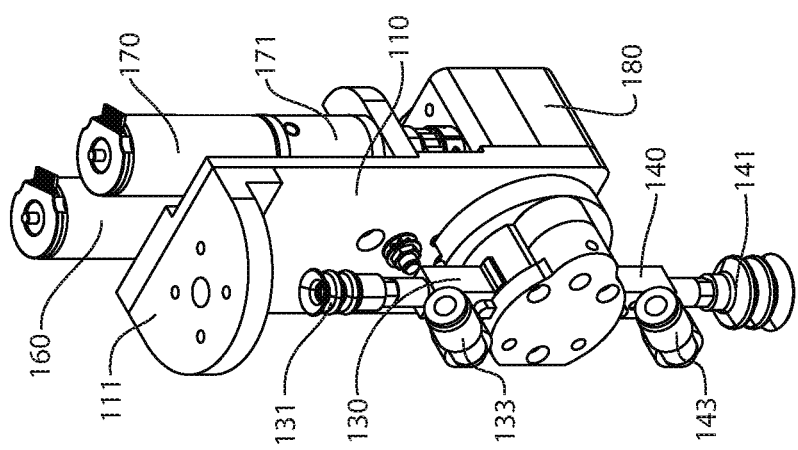
FIGS. 3a and 3b are perspective views of components fastened to a holding element.
Figure 3A:
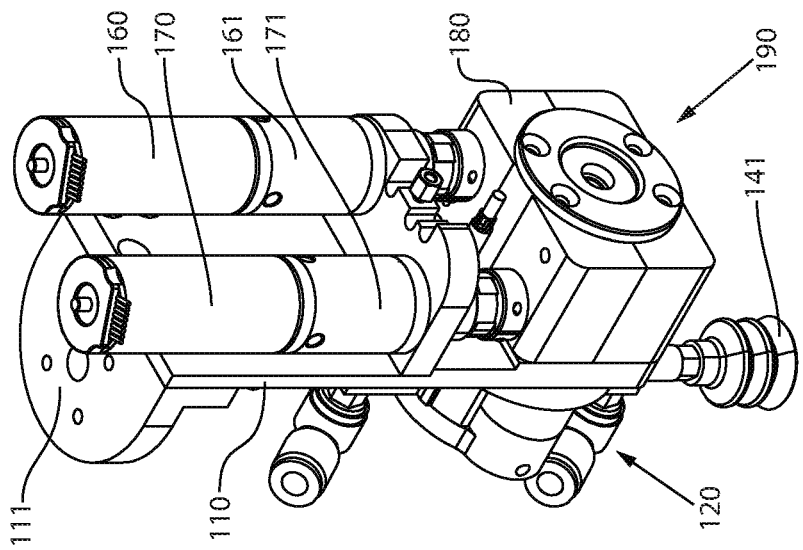

FIGS. 3a and 3b show detailed oblique views of components fastened to the holding element 110, namely the suction arm holder 120. It can be seen clearly in FIG. 3b that suction nozzles 133, 143 are arranged on the suction arms 130, 140, by means of which negative pressure can be applied separately to the suction arms. During operation, the suction nozzles 133, 143 are connected via lines (not shown) to a negative pressure source such that negative pressure can be applied separately to the suction arms 130, 140.

Figure 4:
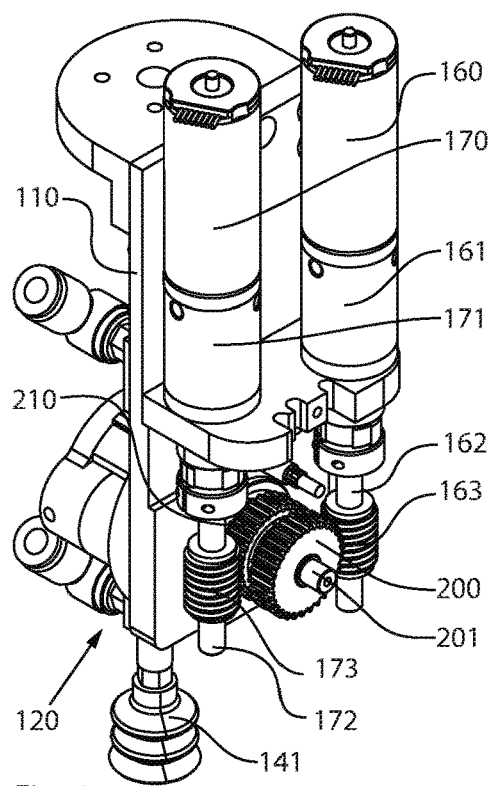
FIG. 4 is a perspective view of a gear unit without a cover.

FIG. 4 shows the view according to FIG. 3a, but without the housing 180 of the gear unit 190. In FIG. 4, it can be seen that rotary axes 162, 172 associated with the drives 160, 170 extend into the gear unit and have worm gear wheels 163, 173 at their lower ends, which interact with toothed wheels 200, 210 which are fastened to two coaxial shafts, with FIG. 4 only showing the inner shaft 201. By the combination of the worm gear wheels and the toothed wheels, the rotational movement of the rotary axes 162, 172 associated with the drives 160, 170 is converted into a rotational movement of the orthogonally aligned coaxial shafts.

Figure 5A:
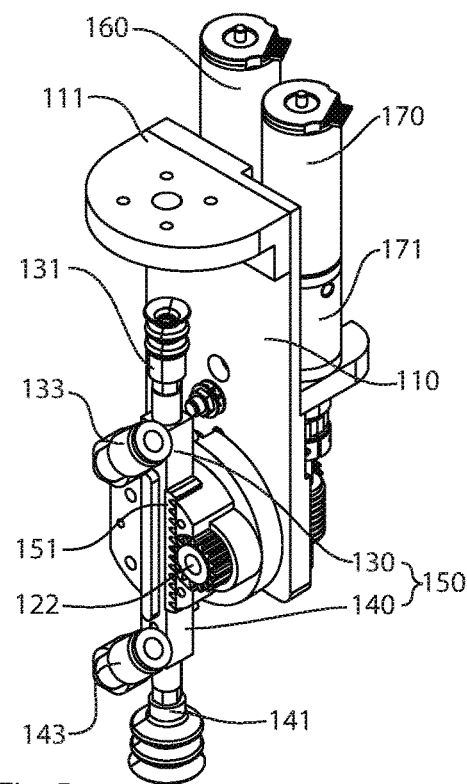
FIG. 5a-5c are various views of a suction arm holder with radially different positions of a suction element.
Figure 5B:
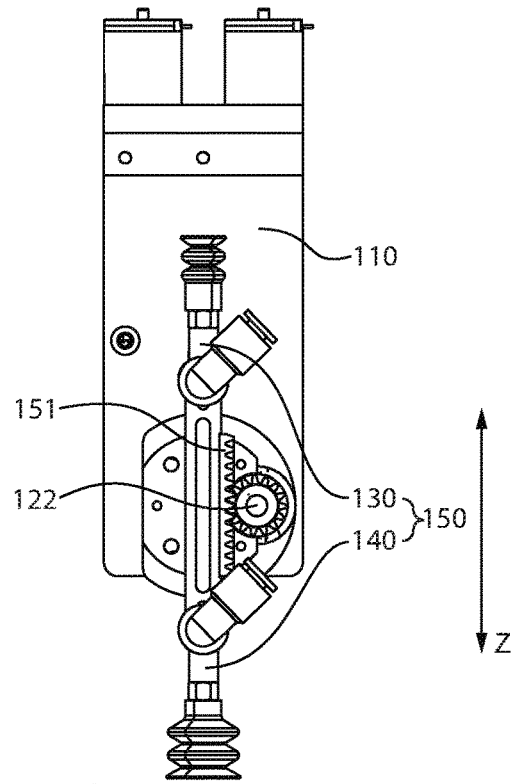
Figure 5C:
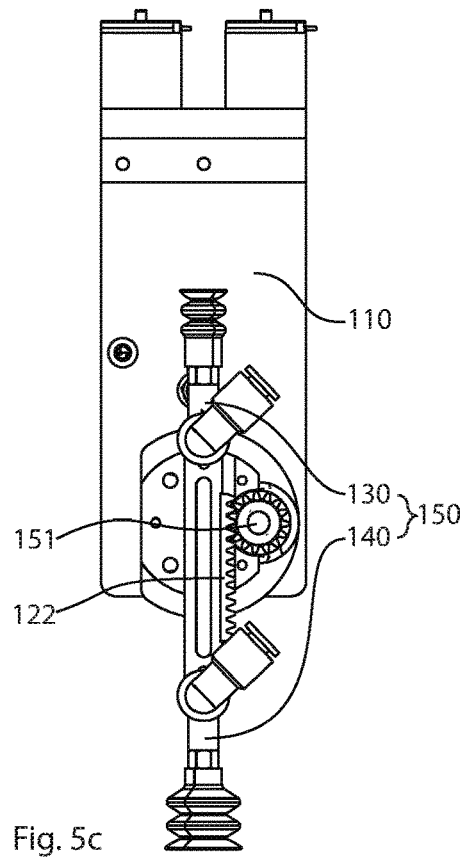

FIGS. 5a-5c show detailed views of the suction arm holder 120, wherein the cover of the suction arm holder is omitted in FIGS. 5a-5c, so that the inner components are visible. The suction arms 130, 140 are part of a one-piece suction arm element 150 (e.g., suction arm assembly) which is guided through a space in the suction arm holder. The suction arm element 150 has a toothed rack 151 which interacts with a toothed wheel 122 which is coupled via a further toothed wheel (not shown in FIGS. 5a-5c) to one of the coaxial shafts. As can be seen in FIGS. 5b, 5c, the suction arm element 150 can be moved by a rotational movement of the toothed wheel 122 in the direction of the arrow shown between the drawings in the Z-direction, wherein the structure of the suction arm element requires that, when the lower suction arm portion 140 is moved downward, the upper suction arm portion 130 is also moved downward, wherein this does not impede the functionality of the suction gripper because only one suction arm facing a small piece good to be picked up is used at a time.

Figure 6A:
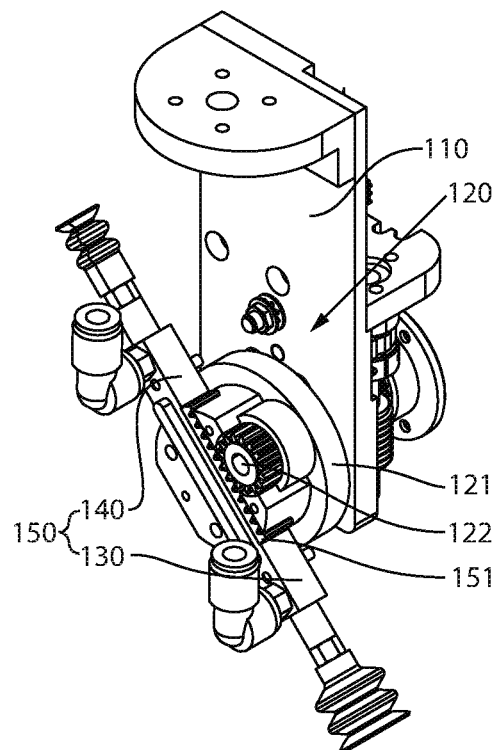
FIGS. 6a and 6b are perspective and front views of the suction arm holder of FIG. 5a in a rotated position.
Figure 6B:
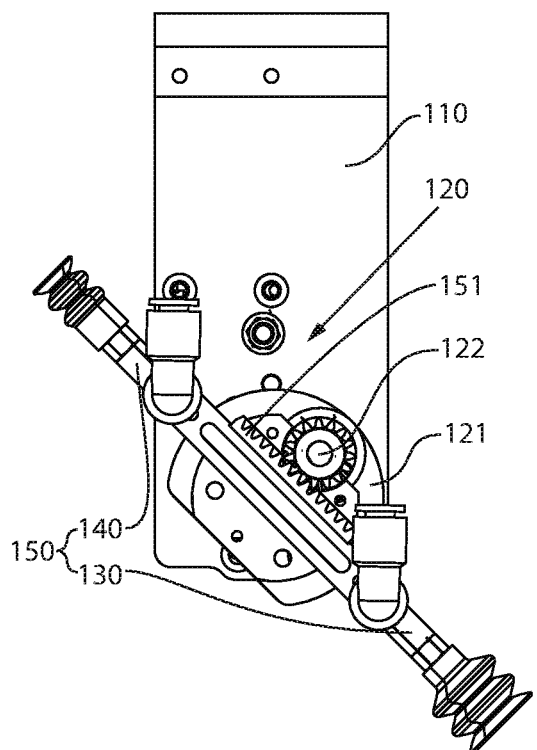

FIGS. 6a and 6b show detailed views of the suction arm holder 120. The suction arm holder 120 includes a main body 121 and components arranged thereon, such as the toothed wheel 122 and the suction arm element. In FIGS. 6a and 6b, the suction arm holder is rotated by 45 degrees. When compared with FIGS. 5b and 5c, it can be seen that the toothed wheel 122 rotates along with a rotational movement of the suction arm holder but still remains coupled to a non-visible toothed wheel in the interior of the suction arm holder.

Figure 7A:
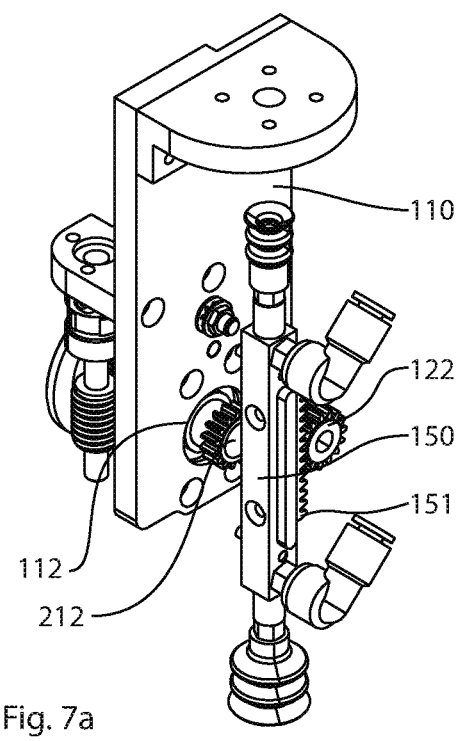
FIGS. 7a and 7b are perspective views of a suction arm element and of components used for a radial movement.
Figure 7B:
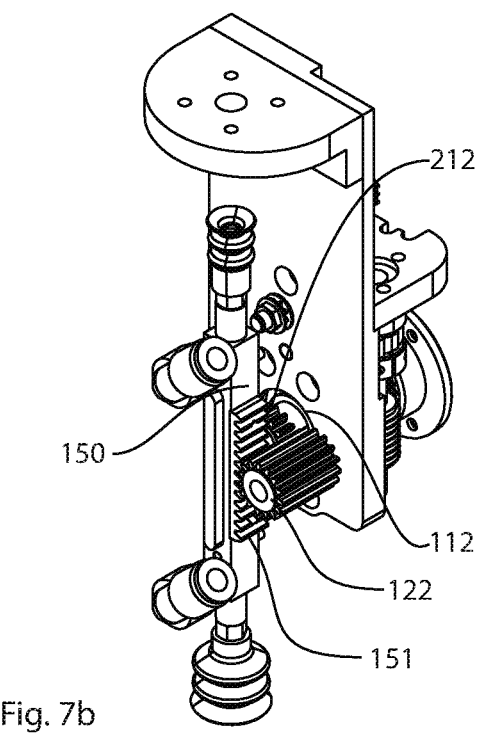

Said coupling can be seen in FIGS. 7a and 7b. By omitting further components of the suction arm holder, it can be seen that one of the coaxial shafts, which extend through an opening 112 in the holding element 110, has a toothed wheel 212. As can be seen in FIG. 7b, it is coupled to toothed wheel 122, which in turn is coupled to the toothed rack 151. Via the gear unit, the rotational movement of one of the drives is thus converted into a rotational movement of the suction arm holder, and the rotational movement of the other drive is converted into a radial movement of the suction arm element.

Figure 8A:
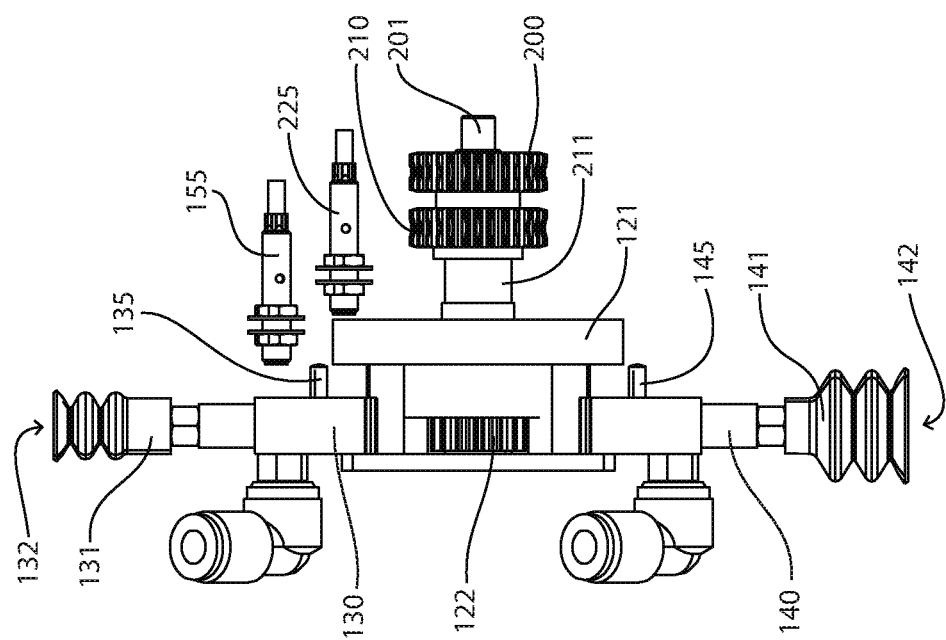
FIGS. 8a and 8b are perspective and side views of a gear unit in combination with a suction arm holder.
Figure 8B:
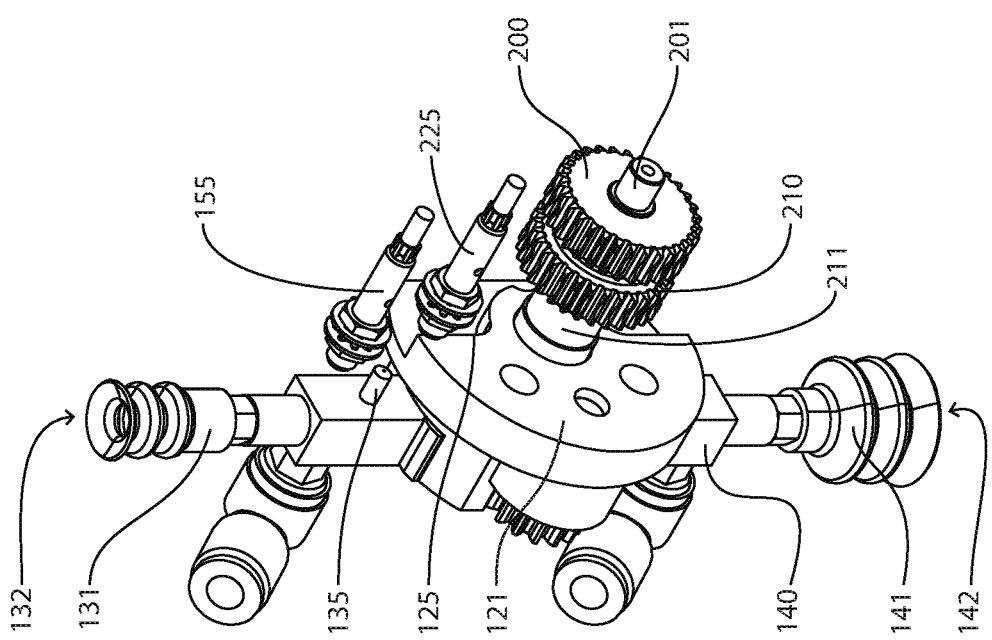

FIGS. 8a and 8b show detailed views of the gear unit and the suction arm holder, wherein the holding element 110 separating these components is omitted. FIGS. 8a and 8b show the two coaxial shafts 201, 211, on which the toothed wheels 200, 210 (e.g., gears) are arranged, wherein toothed wheel 200 interacts with the shaft 201, and toothed wheel 210 interacts with the shaft 211. A rotation of the shaft 201 effects a rotation of the toothed wheel 212, which is shown in FIGS. 7a, 7b, wherein said rotation ultimately leads to a radial movement of the suction arm element 150. A rotation of the outer shaft 211, which is coupled to the toothed wheel 210, entails a rotation of the suction arm holder itself.

FIGS. 8a, 8b further show the radial scanner 155 and the rotation scanner 225. The radial scanner 155 interacts with radial position sensors 135, 145, which are each associated with the suction arm portions 130, 140 of the suction arm element 150. The rotation scanner 225 interacts with rotation position sensors 125, which are designed as edges in the main body 121 of the suction arm holder 120. In the event of an unscheduled restart of the suction gripper, it is possible that the control device knows the exact position of the suction element and/or the suction arm holder. In order to determine the exact alignment or position of the suction arm holder and the suction element, the suction arm holder is rotated until a rotation position sensor is determined (e.g., detected) by the rotation scanner. Due to the arrangement of radial position sensor/suction arm element selected, the determination of a rotation position sensor requires that the suction arm element is arranged perpendicularly when a rotation position sensor is detected. Subsequently, the suction element is moved until the radial scanner determines (e.g., detects) one of the radial position sensors.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A suction gripper for handling small piece goods, the suction gripper comprising:
    a main element;
    a rotary drive arranged on the main element with an axis of rotation that is vertical in a starting position; and
    an end-effector unit coupled to the axis of rotation, wherein the end-effector unit has a holding element, to which a suction arm holder is fastened, wherein the suction arm holder has at least two elongated suction arms which each have a suction head with a suction surface at their distal end, wherein the suction arms are designed such that a negative pressure can be applied to them,
    wherein the suction arm holder is rotatably mounted on the holding element, and the suction surfaces of the suction heads are dimensioned differently for handling different types of small piece goods, and
    wherein two suction arms are designed as a one-piece suction arm element with two opposite suction heads, wherein the suction arm element is radially movable.

2. The suction gripper of claim 1, wherein the suction gripper comprises a gear unit fastened to the holding element opposite the suction arm holder, wherein the gear unit comprises two coaxial axes, wherein a first axis interacts with and effects a rotation of the suction arm holder, and a second axis interacts with and effects a radial movement of the suction arm element.

3. The suction gripper of claim 1, wherein the suction gripper has at least one radial scanner and each suction arm has a radial position sensor, wherein the radial scanner and the radial position sensor are configured to interact with one another.

4. The suction gripper of claim 1, wherein the suction gripper has a rotation scanner and the suction arm holder has a plurality of rotation position sensors, wherein the rotation scanner and the rotation position sensors are configured to interact with one another.

5. The suction gripper of claim 1, wherein each suction arm has a suction nozzle configured to be coupled to a suction line, wherein a negative pressure is configured to be applied separately to each suction line.

6. A suction gripper, the suction gripper comprising:
a base;
a rotary drive arranged on the base, the rotary drive comprising an axis of rotation, wherein the axis of rotation is vertical in a starting position;
an end-effector unit coupled to the axis of rotation, the end-effector unit comprising a holding assembly;
a suction arm holder rotatably mounted on the holding assembly, the suction arm holder comprising at least two elongated suction arms, each elongated suction arm having a suction head with a suction surface at a distal end;
a radial scanner; and
a plurality of radial position sensors.

7. The suction gripper of claim 6, wherein the at least two elongated suction arms are configured to receive a negative pressure.

8. The suction gripper of claim 6, wherein the suction arm holder comprises two suction surfaces that are dimensioned differently from each other.

9. The suction gripper of claim 6, wherein at least one of the at least two elongated suction arms is radially movable.

10. The suction gripper of claim 6, further comprising:
a suction arm assembly comprising two of the at least two suction arms having opposing suction heads, wherein the suction arm assembly is radially movable.

11. The suction gripper of claim 10, further comprising:
a gear unit fastened to the holding assembly opposite the suction arm holder, wherein the gear unit comprises two shafts, wherein a first shaft is configured to cause a rotation of the suction arm holder, and a second shaft is configured to cause a radial movement of the suction arm assembly.

12. The suction gripper of claim 11, further comprising:
a first toothed gear, wherein the first shaft is coupled to the first toothed gear and the first toothed gear is coupled to the suction arm holder, wherein rotation of the first shaft is configured to cause rotation of the first toothed gear and subsequently to cause rotation of the suction arm holder.

13. The suction gripper of claim 12, further comprising:
a second toothed gear, wherein the second shaft is coupled to the second toothed gear and the second toothed gear is coupled to a toothed rack of the suction arm assembly, wherein rotation of the second shaft is configured to cause rotation of the second toothed gear and subsequently to cause radial movement of the suction arm assembly.

14. The suction gripper of claim 13, wherein the first and second toothed gears are disposed adjacent to each other, and wherein the first and second toothed gears and the first and second shafts are disposed on a same longitudinal axis extending from the base.

15. The suction gripper of claim 6, wherein each of the plurality of radial position sensor is disposed on a separate one of the at least two suction arms, and wherein the radial scanner is configured to detect the plurality of radial position sensors.

16. The suction gripper of claim 6, further comprising:
a rotation scanner; and
a plurality of rotation position sensors.

17. The suction gripper of claim 16, wherein the plurality of rotation position sensors are disposed on the suction arm holder, and wherein the rotation scanner is configured to detect the plurality of rotation position sensors.

* * * * *